Oct. 16, 1923.

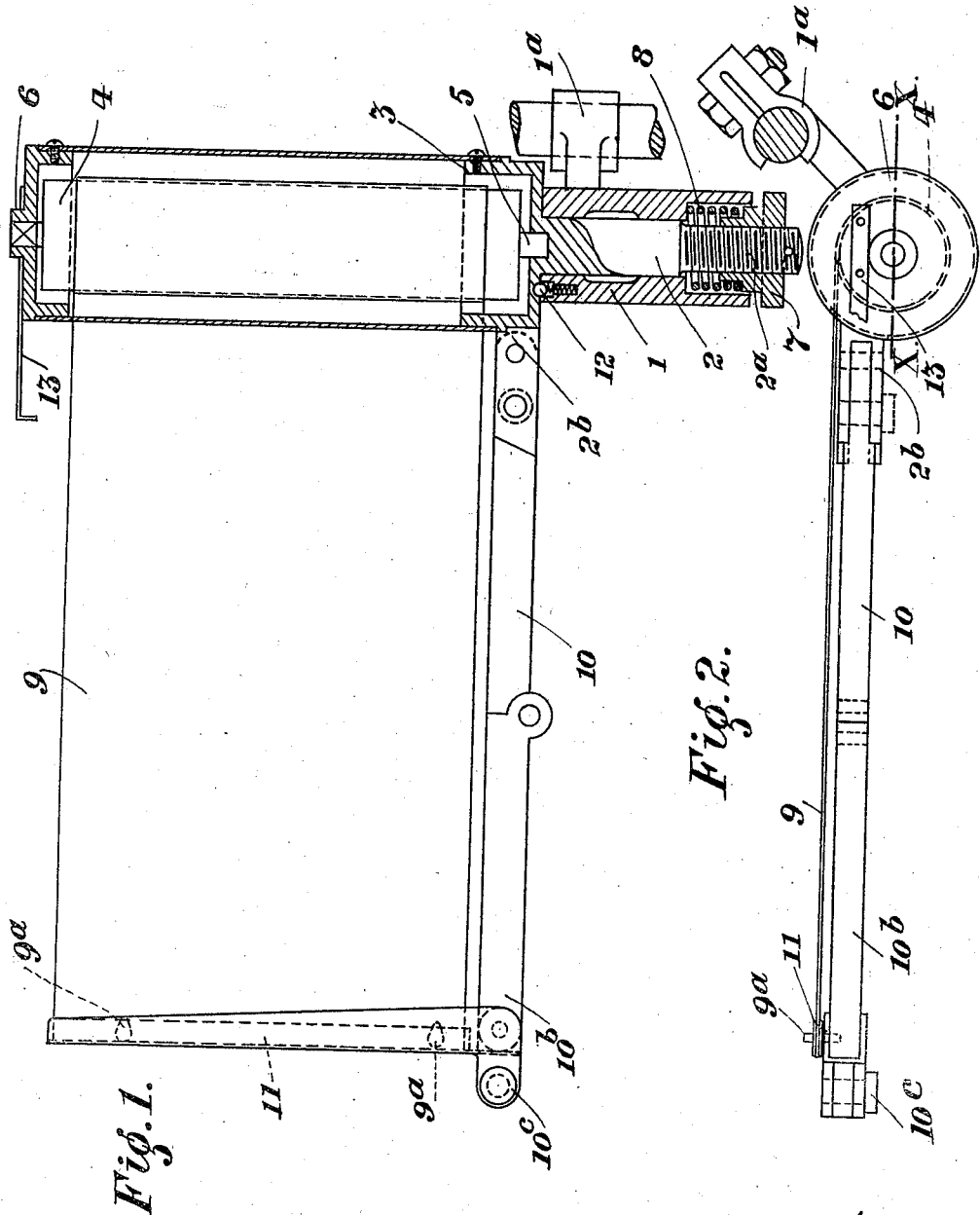

J. McC. BARRY 1,470,800

GLARE SCREEN FOR VEHICLES

Filed Oct. 26, 1922　　2 Sheets-Sheet 2

Inventor:
John McClure Barry
By J. F. Jochum Jr.
Atty.

Patented Oct. 16, 1923.

1,470,800

UNITED STATES PATENT OFFICE.

JOHN McCLURE BARRY, OF BELFAST, IRELAND.

GLARE SCREEN FOR VEHICLES.

Application filed October 26, 1922. Serial No. 596,952.

*To all whom it may concern:*

Be it known that I, JOHN McCLURE BARRY, of 11 St. Judes Avenue, Belfast, Ireland, a subject of the King of Great Britain and Ireland, have invented certain new and useful Improvements in Glare Screens for Vehicles, of which the following is a specification.

This invention relates to devices for protecting drivers of motor cars, and other vehicles, from sun glare and the glare of vehicle head lights, of the class in which a device of coloured material is removably supported in a convenient position in front of the driver, and capable of being moved clear of the driver's vision when required.

Under my invention the anti-glare shield or guard consists of a flexible screen wound on a roller capable of being moved clear of the wind screen and also of being moved into position at the side of the wind screen, and, permitting the roll of flexible anti-glare material to be unwound from the roller and held rigidly in position, when required for use. A foldable or removable carrier is provided for holding the flexible shield in position, whilst a turntable support which carries the roller, roller casing, and foldable or removable carrier, permits of the shield being swung clear to give uninterrupted vision, or to be swung into position to act as a glare guard whilst the shield remains extended.

The invention will be described with reference to the accompanying drawings whereon one form of anti-glare device according to the invention is shown by way of example.

Fig. 1 is an elevation of the anti-glare shield showing the shield extended and showing, in section, the turnable support for the roller.

Fig. 2 is a plan view corresponding to Fig. 1.

Referring to the drawings:—

Figure 3:
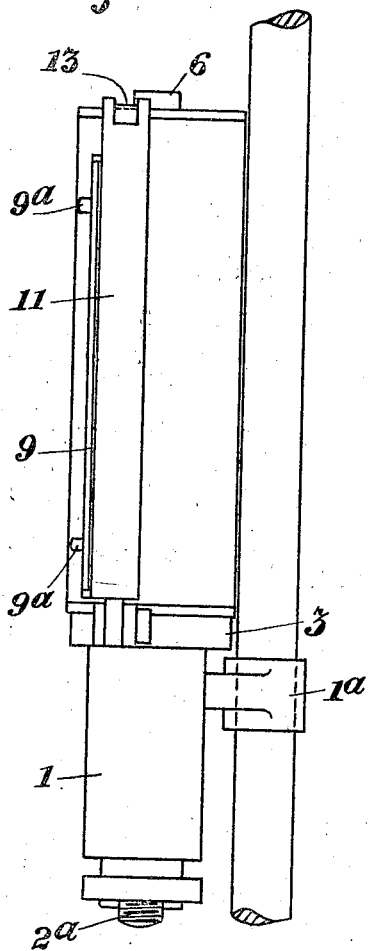
Fig. 3 is an elevation, showing the device collapsed and turned to give the minimum obstruction of view when the device is not in use.

The anti-glare shield, in the example shown, comprises a bracket 1 which forms a bearing for a spindle 2 adapted to support the roller casing 3 wherein a spring action roller 4 is provided and turnably supported at its lower end in a bottom bearing at 5, whilst its top end is held against rotation at 6 after the manner of a spring blind roller. The roller carrying member and spindle 2 are turnable in the bracket 1, being retained in position in the bracket by a nut 7 on the screw threaded end 2ª of the spindle. A spring 8 is provided between the bracket 1 and the nut 7 so that the roller casing, roller, etc., are held in position whilst permitting them to be turned bodily when required. The anti-glare shield or curtain 9 is wound on the roller 4 and is pulled outwards against the action of the roller spring, in known manner, to the position shown at Fig. 1. In order to provide rigid support for the anti-glare shield 9, in its extended position, a hinged or foldable member 10 is provided and turnably secured to a projection 2ᵇ on the roller carrying member 2 and it carries, at its end 10ᵇ, a support 11 for the anti-glare screen 9, consisting of a channel shaped member which is turnably secured on the end 10ᵇ of the member 10 and rigidly fixed by means of a screw 10ᶜ which also serves to lock the collapsed members in the projecting jaws 2ᵇ. The member 11 is adapted to have attached to its projections or clips 9ª on the end of the flexible shield 9.

Figure 4:
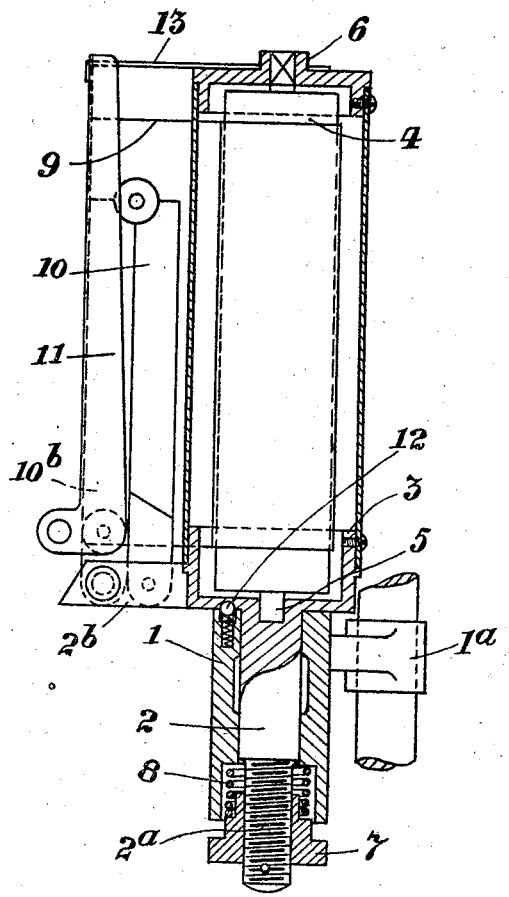
Fig. 4 is a view corresponding to Fig. 1 but showing the anti-glare shield re-wound on the roller and showing the support for the shield collapsed against the roller casing.

When the anti-glare shield is not required it can be easily swung out of the way, without taking it out of its supporting member 11, leaving the shield extended ready to be instantly returned to its, in use, position, when required, and when it is not likely to be required for some time the anti-glare shield 9 can be wound on its roller and the members 10 and 11 collapsed to the position shown in Fig. 4, when the device can be turned to the position shown at Fig. 3 leaving the least possible obstruction at the side of the wind screen.

A spring catch 12 is shown in Fig. 1, for engaging the turnable roller carrying member 2 and for holding it in proper position in relation to the wind screen of the vehicle. A spring clip 13 is shown for holding the member 11 in its collapsed position.

The bearing for the roller spindle 2 may, if desired, be supported on the part 1ª so as to be turnable about a horizontal axis.

Having now fully described my invention what I claim and desire to secure by Letters Patent is:—

1. An anti-glare device comprising a supporting bracket, a casing turnably mounted in said bracket, a roller turnably supported in said casing, a flexible screen of anti-glare material attached to said roller and normally wound thereon, and collapsible means carried by said casing for retaining said screen in the extended position when required.

2. An anti-glare device comprising a supporting bracket, a casing turnably mounted in said bracket, a roller turnably supported in said casing, a flexible screen of anti-glare material attached to said roller and normally wound thereon, collapsible means carried by said casing for retaining said screen in the extended position when required, and frictional means normally restraining bodily rotational movement of said roller, screen and casing.

3. An anti-glare device embodying a roller, a curtain wound thereupon, means turnably supporting said roller, a bracket supporting said means, means for retaining the flexible material of the said blind in an extended position, when required, whilst leaving said roller and curtain free to be turned bodily relative to the bracket, and automatically acting means for locking said roller and curtain in certain angular positions to which they may be bodily turned relative to the bracket.

4. An anti-glare device comprising a supporting bracket, a casing turnably mounted in said bracket, a roller turnably supported in said casing, a flexible screen of anti-glare material attached to said roller and normally wound thereon, and means carried by said casing whereby said screen can be retained in its extended position, when required, the said casing being adapted to be turned when the said screen is either wound upon or unwound from the said roller.

5. An anti-glare device comprising a supporting bracket, a casing turnably mounted in said bracket, a roller turnably supported in said casing, a flexible screen of anti-glare material attached to said roller and normally wound thereon, a hinged member carried by said casing, a support at the outer end of said member, and means for attaching the free end of said screen to said support.

6. An anti-glare device comprising a supporting bracket, a casing turnably mounted in said bracket, a roller turnably supported in said casing, a flexible screen of anti-glare material attached to said roller and normally wound thereon, a hinged member carried by said casing, a support at the outer end of said member, means for attaching the free end of the screen to said support, and locking means on the casing for engaging said support in the folded position of said hinged member.

7. An anti-glare device comprising a supporting bracket, a casing turnably mounted in said bracket, a roller turnably supported in said casing, a flexible screen of anti-glare material attached to said roller and normally wound thereon, a hinged member carried by said casing, a support at the outer end of said member, means for attaching the free end of said screen to said support, and means for locking said hinged member and support in the folded position.

8. An anti-glare device comprising a supporting bracket, a casing turnably mounted in said bracket, a roller turnably supported in said casing, frictional means normally preventing rotation of said casing, a flexible screen of anti-glare material attached to said roller and normally wound thereon, and means carried by said casing for retaining said screen in the extended position, when required, the said casing being turnable when the said screen is either wound upon the roller or extended.

9. An anti-glare device comprising a supporting bracket, a casing turnably mounted in said bracket, a roller turnably supported in said casing, frictional means normally preventing rotation of said casing, a flexible screen of anti-glare material attached to said roller and normally wound thereon, and foldable means carried by said casing for retaining said screen in the extended position, when required, the said casing being turnable when the said means is either folded or extended.

10. An anti-glare device comprising a supporting bracket, a casing turnably mounted in said bracket a roller turnably supported in said casing, frictional means normally preventing rotation of said casing, a flexible screen of anti-glare material attached to said roller and normally wound thereon, a hinged member carried by said casing, a support at the outer end of said member, and means for attaching the free end of said screen to said support, the said casing being turnable when the hinged member is either in its folded or unfolded position.

11. An anti-glare device comprising a supporting bracket, a casing turnably mounted in said bracket, a roller turnably supported in said casing, frictional means normally preventing rotation of said casing, a flexible screen of anti-glare material attached to said roller and normally wound thereon, a hinged member carried by said roller casing, a support at the outer end of said member, means for attaching the free end of said screen to said support, and means for locking said hinged member and support in the folded position, the said casing being turnable when the said hinged member is either in its folded or unfolded position.

12. A device of the character described embodying a bracket, a support rotatably mounted upon the bracket, a hinged member, one end of the member being pivoted to the said support, a support pivotally connected to the free end of said member, means for maintaining the last recited support against pivotal movement with respect to the said member, a roller turnably mounted upon the support, a curtain wound upon the roller, and means for connecting the end of the curtain to the second recited support.

13. A device of the character described embodying a bracket, a support rotatably mounted upon the bracket, a hinged member, one end of the member being pivoted to the said support, a support pivotally connected to the free end of said member, means for maintaining the last recited support against pivotal movement with respect to the said member, a roller turnably mounted upon the support, a curtain wound upon the roller, means for connecting the end of the curtain to the second recited support, and means for yieldably restraining the said bracket against rotation with respect to its support.

14. A device of the character described embodying a bracket, a support rotatably mounted upon the bracket, a hinged member, one end of the member being pivoted to the said support, a support pivotally connected to the free end of said member, means for maintaining the last recited support against pivotal movement with respect to the said member, means co-operating with the last recited means for assisting in maintaining the said member and the second recited support folded with respect to the first said support, a roller turnably mounted upon the support, a curtain wound upon the roller, and means for connecting the end of the curtain to the second recited support.

15. A device of the character described embodying a bracket, a support rotatably mounted upon the bracket, a hinged member, one end of the member being pivoted to the said support, a support pivotally connected to the free end of said member, means for maintaining the last recited support against pivotal movement with respect to the said member, a roller turnably mounted upon the support, a curtain wound upon the roller, means for connecting the end of the curtain to the second recited support, and means for maintaining the said member and the second recited support in folded relation.

16. A device of the character described embodying a bracket, mounted for swinging movement, a support rotatably mounted upon the bracket, a hinged member, one end of the member being pivoted to the said support, a support pivotally connected to the free end of said member, means for maintaining the last recited support against pivotal movement with respect to the said member, a roller turnably mounted upon the support, a curtain wound upon the roller, and means for connecting the end of the curtain to the second recited support.

17. A device of the character described embodying a bracket, a casing pivotally mounted upon the bracket, a roller in the casing, a curtain wound upon the roller, a hinged member, one end of the member being pivotally connected with the casing, a support pivotally connected with the free end of said member, said member and support being foldable with respect to each other and against the casing, means for maintaining the said support against pivotal movement with respect to the said member when the latter is unfolded, and means for connecting the end of the curtain to the said support.

18. A device of the character described embodying a bracket, a casing pivotally mounted upon the bracket, a roller in the casing, a curtain wound upon the roller, a hinged member, one end of the member being pivotally connected with the casing, a support pivotally connected with the free end of said member, said member and support being foldable with respect to each other and against the casing, means for maintaining the parts in their folded positions, means for maintaining the said support against pivotal movement with respect to the said member when the latter is unfolded, and means for connecting the end of the curtain to the said support.

19. A device of the character described embodying a bracket, a casing pivotally mounted upon the bracket, means for yieldingly restraining the casing in the position to which it may be moved about its pivot, a roller in the casing, a curtain wound upon the roller, a hinged member, one end of the member being pivotally connected with the casing, a support pivotally connected with the free end of said member, said member and support being foldable with respect to each other and against the casing, means for maintaining the said support against pivotal movement with respect to the said member when the latter is unfolded, and means for connecting the end of the curtain to the said support.

In testimony whereof I affix my signature in presence of two witnesses.

JOHN McCLURE BARRY.

Witnesses:
 NORMAN BARRY HUNN,
 ANDREW HAMILTON.